April 29, 1969     R. F. PASTUSZAK     3,441,121
APPARATUS FOR RAPIDLY AND PRECISELY POSITIONING
A SUCCESSION OF SMALL WORKPIECES
Filed Aug. 31, 1967

INVENTOR
RONALD F. PASTUSZAK
BY
*Sperry and Zoda*
ATTORNEYS

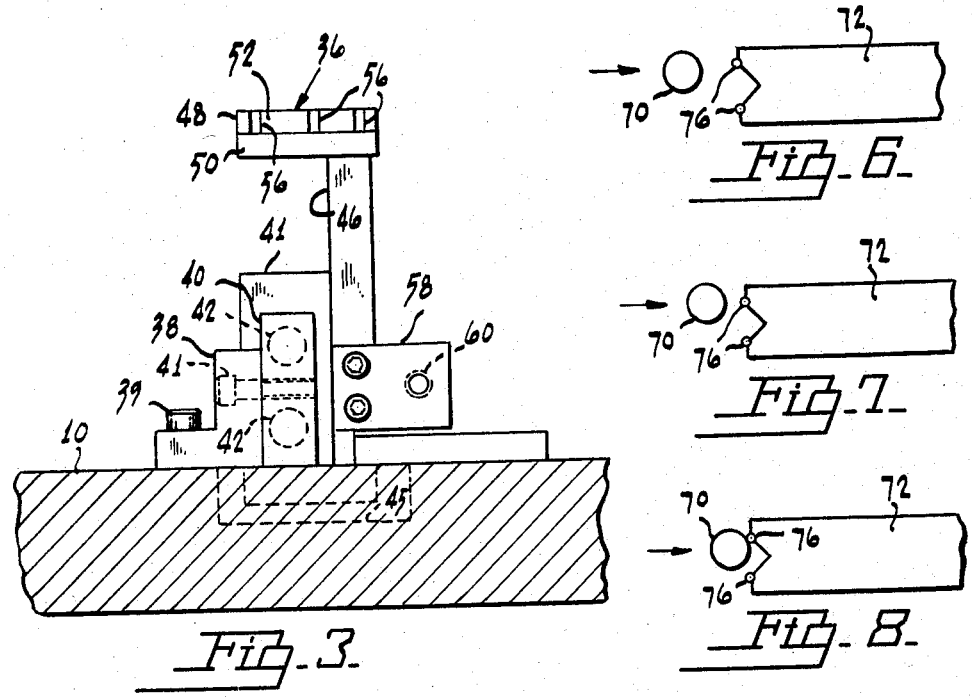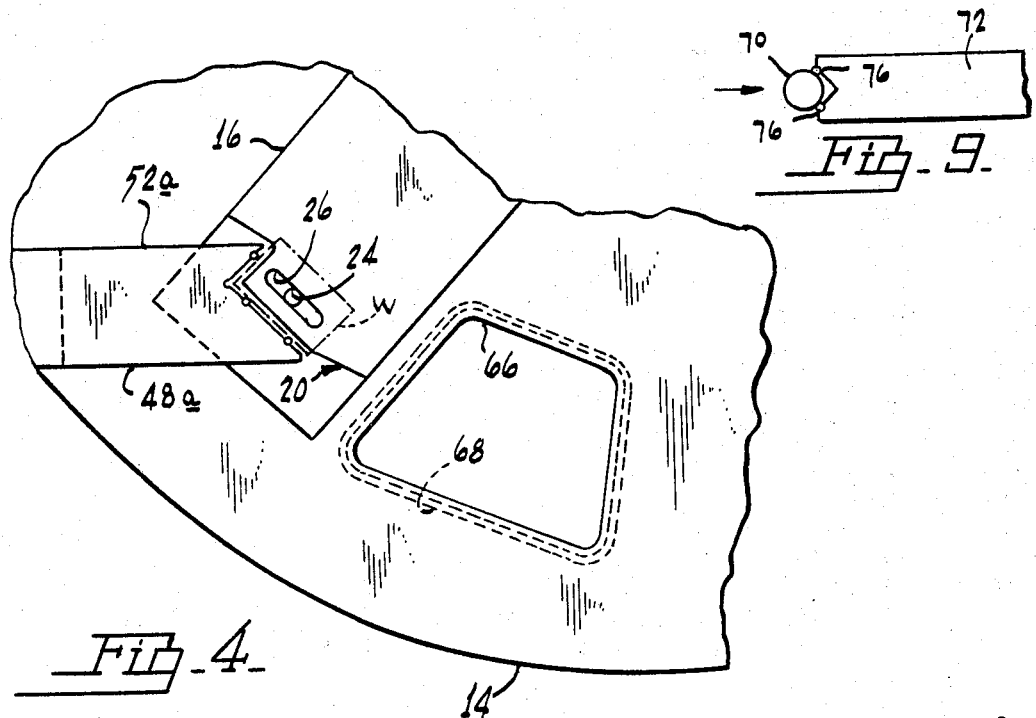

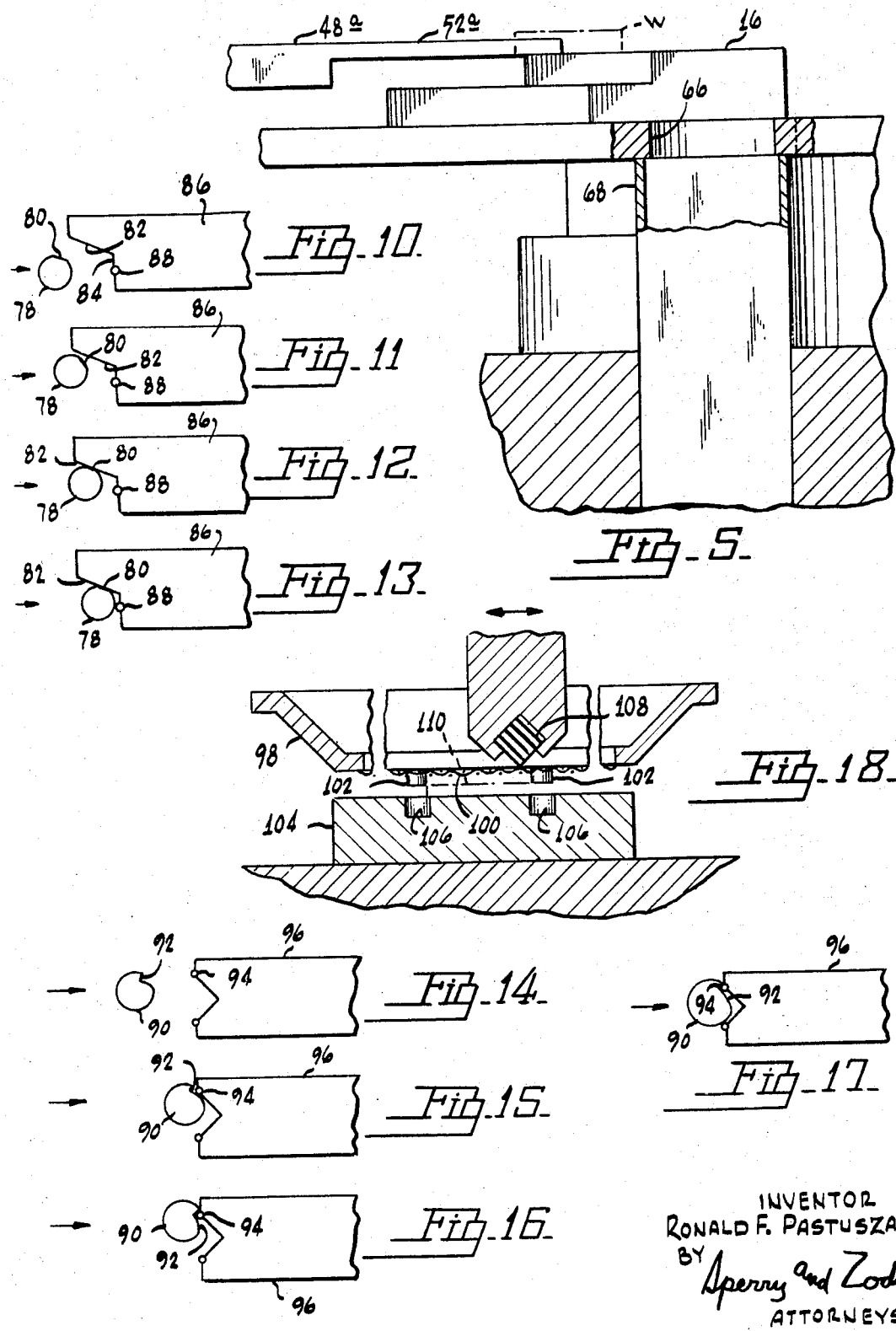

United States Patent Office

3,441,121
Patented Apr. 29, 1969

3,441,121
APPARATUS FOR RAPIDLY AND PRECISELY POSITIONING A SUCCESSION OF SMALL WORKPIECES
Ronald F. Pastuszak, Allentown, Pa., assignor to Precision Systems Company, Inc., Somerville, N.J., a corporation of New Jersey
Filed Aug. 31, 1967, Ser. No. 664,785
Int. Cl. B65g 47/24
U.S. Cl. 198—33         5 Claims

ABSTRACT OF THE DISCLOSURE

Apparatus that precisely positions small workpieces, such as substrates on which microcircuits are printed, for performance of a manufacturing operation thereon, as the piece arrives at the work station where the operation is to be performed. A positioning bar, mounted in full independence of the support structure upon which the workpieces are carried to the station, travels in a path that results in its engaging the workpiece at peripherally spaced locations thereon, and with the piece so engaged, continues its travel to a final position which precisely locates the workpiece.

BACKGROUND OF THE INVENTION

Field of the invention

In a general sense, the invention pertains to that field of manufacturing operations having to do with the positioning of any of various, small workpieces in a precise fashion, so that a manufacturing step, requiring exceedingly close adherence to carefully established tolerances, can be carried out upon the workpiece. The invention, thus, can be appropriately considered as being concerned with exact orientation of articles either upon a conveying structure for said articles, or for that matter upon a stationary support structure upon which articles can be moved in succession, either manually or otherwise, to and from a work station where the precise positioning is to be effected.

Description of the prior art

A manufacturing operation in which precise positioning of a workpiece is required, and in which the workpiece is of a small, wafer-like shape that makes said positioning particularly difficult, is the printing (as for example, by the silk screen process) of microcircuits upon ceramic substrates.

In a silk screen printing operation, the part to be printed must be located under the screen, and the approach to locating the part has varied over the years, in different fields.

In the printing of microcircuits, by far the most popular type of machine in use today employes the so-called flat bed or carriage type method of locating the part under the screen.

This type of system uses a carriage, usually travelling on parallel rods, on which is supported the substrate tooling. It is free to travel from a load position outside of the screen to a print position under the screen.

The most significant advantage of the carriage method is its ability to be repeatedly positioned under the screen, in the print position, with a high degree of accuracy. Positioning accuracy repeatable to ±.0005 or .001 inch is attainable. It may be observed, however, that this accuracy refers to any mechanical point on the carriage, but not necessarily to the substrate supported thereon, which may shift independently if not held properly.

In any system in which a part is loaded on and unloaded from a reciprocal positioner of the carriage type, load and unload cycle time is a significant factor in the cycle. It is obvious that a reduction of cycle time might be accomplished if there was a through feed rather than reciprocal action as in a carriage.

That portion of the carriage cycle returning to the load position, and the need for time to move all the way from load to print positions in one step, add to the time without contributing to the function of positioning.

Accordingly, high speed production machines now available eliminate the drawbacks of carriage operation in timing by using a rotary work table or dial. A dial makes it possible, by a series of small increment movements or indexes, to move the part in stages into print position. There is no need for reciprocal action to return to load position. Dials further improve timing by providing free positions for both load and unload, to proceed simultaneously with the printing operation.

Efficient dial design can reduce a relatively standard 3-second cycle on an automatic load carriage type machine to as little as 2, 1.5 or even 1 second per cycle, appreciably increasing productivity.

Dials for such applications must be capable of cycling or indexing in a fraction of a second, accurately.

The matter of registration is, however, completely different in a dial-type system. There may be as many as eight or more work holders to be registered, that is, precisely positioned, in sequential order below the same screen. The problem here is that even the most accurate indexing system for such a dial has angular error and falls short of meeting the increasingly closer tolerances required in the art with respect to the positioning of the workpieces for printing. Then too, additional angular error is picked up in locating the work holder on the dial, and in boring holes for the part-locating pins of the holder.

The whole problem it is believed, can be considerably simplified and greater accuracy assured by separating the locating function from the part moving function.

In accordance with the invention, it is proposed that this be done by having a locator which pushes the part into proper registration, and which is mounted off of and fully independently of the dial, in a fixed relation to the screen printer assembly. At most, such a locator needs only to reciprocate through a very short stroke to clear the tooling. The dial design can now be developed solely for high speed.

An approach to solution of the problem, in the direction indicated above, has been made in my Patent No. 3,297,134 issued Jan. 10, 1967. However, although that patent shows a work orienting device mounted independently of the part moving means, the reciprocating motion of said device must still be in timed relation to indexing of, and hence is dependent upon, the travel of the conveyor on which the workpieces are moved to and away from the work station. It is desirable, in eliminating the various problems now existing in the prior art, to not only eliminate load and unload cycle time as discussed above, and angular error resulting from positioning of the part by the conveyor or dial, but also to eliminate any dependence of the positioning and printing operation upon the indexing of the dial. In this way, the speed of dial indexing need not be dependent upon the speed of the work positioner device, and vice versa. In fact, it is desirable to permit the work positioner to position a piece, hold it in position while it is being printed, and remove it from the dial, without any stoppage, slowing down, or indexed movement of the dial at all.

SUMMARY OF THE INVENTION

Looking toward a solution of the several problems indicated above, the present physical embodiment of the invention comprises a stand or base mounted outwardly from the periphery of the rotary work-support structure or dial. Mounted upon the stand or base is a flat, elongated, positioning bar, the forward end of which is formed with an angular recess. Said recess, in the preferred embodiment, has edges that correspond to edges of the workpiece, and in accordance with the invention it would be possible to remove one positioning bar having a particular recess designed to complement a workpiece, for substitution of a different positioning bar the recess of which is differently shaped, to complement another workpiece. Versatility of the positioning mechanism is thus enhanced.

Further, in accordance with the invention, the positioning bar is extended across the periphery of the dial, and may be retracted through a short rapid stroke, by an air cylinder operation or the like, to clear the finished workpiece as the next piece starts to index into the work position.

Provided upon the dial are uniformly, angularly spaced workpiece support blocks, and in the preferred embodiment these blocks have openings therethrough connected to a source of vacuum, whereby to hold upon the blocks the several workpieces. The workpieces need be only generally (as distinguished from precisely) positioned, when initially deposited upon the dial. Thereafter, when they move to the work station at which the printing is to be performed, they are registered exactly and precisely, within extremely close tolerances, in respect to the printer, through the provision of the positioning bar. The positioning bar travels forwardly into engagement with the workpiece, and moving on to its final position, locates the workpiece with the precision desired, after which the positioning bar is retracted.

It is proposed that in some forms of the invention, the positioning bar may remain in its advanced position, while the printing operation is being performed, and in this event the dial can continue rotating. In an arrangement such as this, at the completion of the printing operation the part, held in position by the positioning bar while the dial rotates, can drop into a discharge chute, through an opening of the dial moving into registration with the part as the dial turns.

BRIEF DESCRIPTION OF THE DRAWING

FIGURE 3 is a front end elevational view of the positioning apparatus as seen from line 3—3 of FIGURE 2;

FIGURE 4 is a fragmentary top plan view of a modified construction;

FIGURE 5 is a fragmentary side elevational view of the modification shown in FIGURE 4;

FIGURES 6–9 are somewhat diagrammatic views of a modified arrangement wherein the workpiece is circular;

FIGURES 10–13 are views similar to FIGURES 6–9, showing another modified arrangement wherein the workpiece is circular with a flat extending over part of its circumference;

FIGURES 14–17 are views similar to FIGURES 6–9 showing still another modification wherein the workpiece is circular with a notch in its circumference; and FIGURE 18 is a sectional view, portions being broken away, showing another modified arrangement wherein the positioning means is attached directly to the screen.

DESCRIPTION OF THE PREFERRED EMBODIMENT

Figure 1:
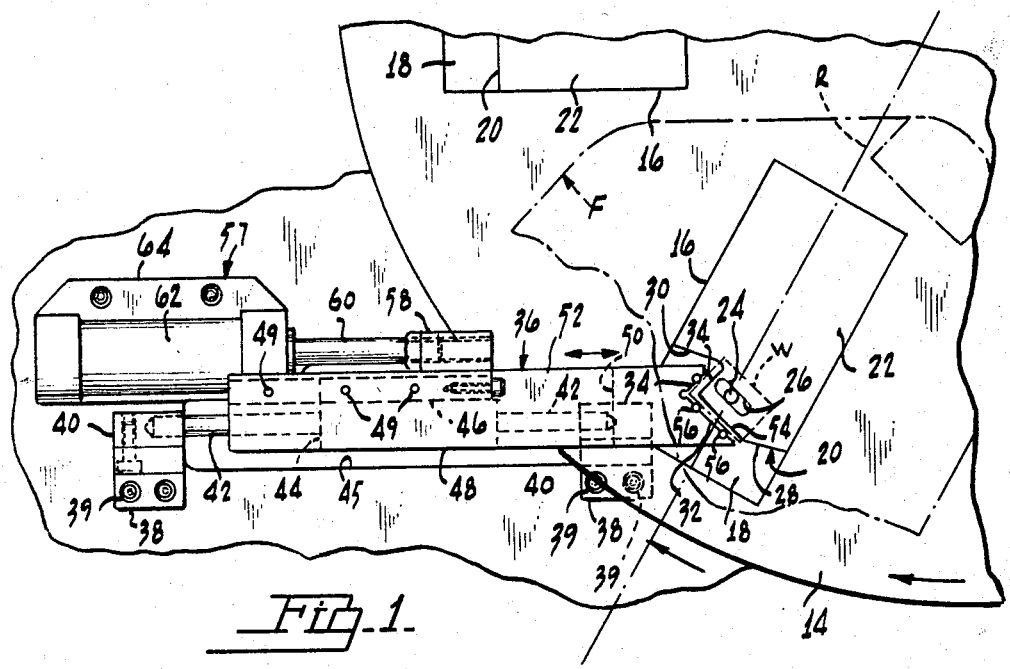
FIGURE 1 is a top plan view of the workpiece positioner, in which the dial is shown fragmentarily, a workpiece being shown in dotted lines as it appears when precisely positioned by the positioning member, shown in its advanced position.

A flat, stationary base or table 10 has a pedestal 12 on which is rotatably mounted a horizontal, flat dial 14. Fixedly secured to the flat top surface of dial 14 are work-support blocks 16 which in the present instance, but not necessarily, are rectangular in general configuration, and are located radially of the dial. Blocks 16 are uniformly angularly spaced about the dial at intervals of, for example, 45°. The outer end portion of each block is stepped downwardly as at 18 to define a front edge 20 of a flat work-support surface 22. A workpiece W which in the present instance is in the form of a small, flat, rectangular wafer is held flatwise against said surface, through the provision of a vacuum line 24 opening through surface 22 and communicating with an elongated, shallow groove 26 formed in surface 22 to extend the suction effect produced through the vacuum line, over a substantial area of the underside of the workpiece.

Edge 20 extends transversely over the full width of block 16, and may appropriately be considered as being generally Z-shaped. Edge 20, thus, has a first end portion 28 extending from one side of block 16, and an opposite end portion 30 extending from the other side of block 16. End portions 28, 30 extend transversally radius R of dial 14, with end portion 30 being offset rearwardly, that is, toward the dial center, in respect to end portion 28 as best shown in FIGURE 1.

End portions 28, 30 respectively merge into first and second work-orienting edge portions 32, 34 respectively. These meet at right angles to each other with edge portion 32 being disposed at an angle of 15° to a line normal to radius R. This angle is not critical but has been found to produce desirable results. Preferably, groove 26, as shown in FIGURE 1, is parallel to edge portion 32, for the reason that workpiece W is arranged with its length parallel to edge portion 32. Thus, corresponding disposition of the groove 26 extends the vacuum effect along a substantial part of the workpiece length.

The workpieces may be loaded upon their support blocks 16 at any location upon the dial angularly spaced from the work station at which workpiece W is shown in FIGURE 1. The workpieces can be loaded manually, or automatically, and it is mainly important to note that when so loaded, they need not be precisely positioned, but rather, only generally positioned, with one end edge and one longitudinal edge of the workpiece overhanging edge portions 34, 32 respectively.

The apparatus used for precisely positioning the workpiece W at a work station under a screen printing frame F shown fragmentarily in dash-dotted outline in FIGURE 1, has been generally designated 36. It is mounted wholly independently of and is free of connections to the dial 14.

Since the screen printing frame F is conventionally mounted off of and completely independently of the dial, it becomes apparent that the printing frame, and in particular the screen thereof through which the ink is forced in selected configuration onto workpiece W, is precisely located without possibility of being affected by angular error found in the indexing mechanism, location of work support block 16, or other characteristic of the rotary dial. Similarly, the positioning device 36, being also mounted completely off of and independently of the dial, does not pick up any angular error found in the dial, so that in effect, the precise positioning of the printing frame F and the precise positioning of workpiece W by apparatus 36, are established in relation to one another without regard to the indexing, or the mounting, of the dial, thus assuring maximum adherence to the exceedingly close tolerances called for in the art.

The positioning device 36, and for that matter the dial and the screen printing frame F, are all mounted upon the common base or support table 10. This, as will be understood, is effectively maintained in a wholly stationary position, in any suitable manner.

In the illustrated embodiment of the invention, spaced support brackets 38 of L shape are secured fixedly, as by screws 39, to the table. As shown to particular advantage in FIGURE 3, guide rod support blocks 40 in the form of flat, upstanding, rectangular plates, are secured to brackets 38 by means of screws 41.

A pair of horizontally extending, vertically spaced guide rods 42 are supported at their ends in confronting openings 43 of the guide rod support blocks 40, and extend through end to end bores provided in a carriage 44 that is thus slidably mounted upon the guide rods. Referring to FIGURE 3, a flat positioning bar support plate 46 is fixedly secured to one side of and extends upwardly from carriage 44, and fixedly, detachably mounted upon the top surface of the plate 46 is the workpiece positioning bar or member 48. The detachable connection of member 48 to its associated support plate 46 may be by means of screws 49 extending downwardly through openings formed in the member 48, and threadedly engaged in upwardly opening recesses of plate 46.

In this way, the positioning member 48 can be removed, for substitution of a different positioning member, according to the shape of the particular workpiece that is being processed at the time. In the illustrated example, the particular dimensions of the rectangular workpiece W call for the provision of a positioning member 48 having a front end recess that corresponds to the peripheral shape of an adjacent side and end of the workpiece.

Figure 2:
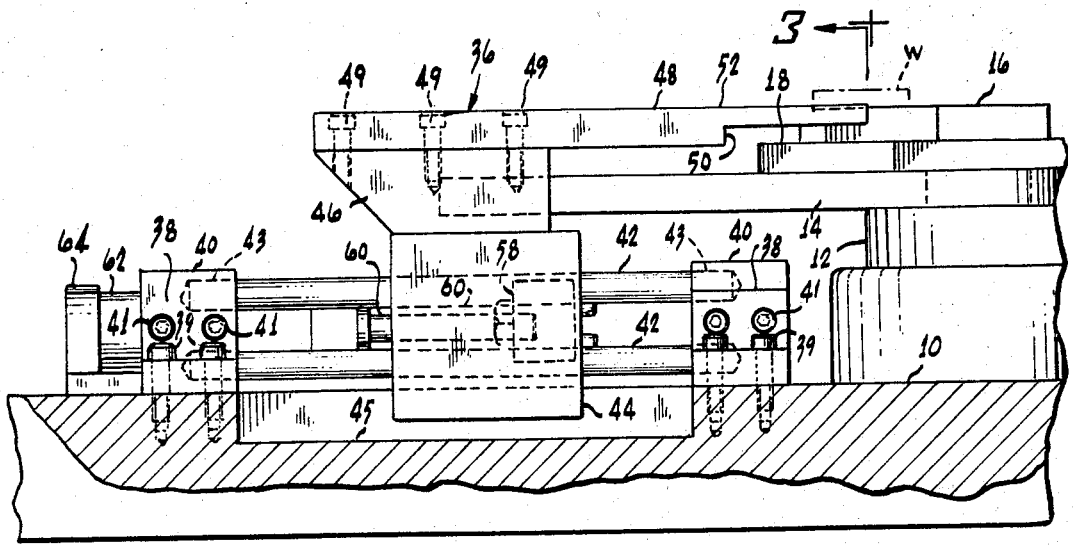
FIGURE 2 is a side elevational view of the positioning device in which the supporting table is shown fragmentarily and partially in section, the dial being shown fragmentarily in side elevation.

Referring to FIGURE 2, in the illustrated example the front end portion of positioning member 48 is undercut as at 50 to define at the front end of the bar a tongue or extension 52 of reduced thickness in respect to the major portion of member 48. Formed in the front end of extension 52 (see FIGURE 1) is a right angular recess 54, the edges of which are parallel to the corresponding edge portions 32, 34 of workpiece support block 16. In the forwardmost position of member 52, which position is shown in FIGURE 1, the edges of recess 54 are in closely spaced relation to the edge portions 32, 34.

Accordingly, when the member 48 is moved from a normally retracted position to its advanced position shown in FIGURE 1, it will, during said movement, engage the adjacent edges of the workpiece W, which as noted above overhangs the ledge-like edge 20 of workpiece support block 16 when initially loaded upon the dial. The vacuum established within opening 24 and the communicating groove 26 is operative upon the workpiece to set up a yielding opposition to movement of the workpiece by the positioning member, as the positioning member continues to travel to the right in FIGURE 1 to its forwardmost position.

Accordingly, when the member 38 arrives at its advanced position shown in FIGURE 1, workpiece W will be precisely positioned, and will remain in said position due to the exertion of the vacuum through opening 24, even though member 48 is now retracted preliminary to printing of the workpiece W through frame F.

In order to precisely position the workpiece, there are provided pins 56 mounted in the angularly related edges of recess 54, and constituting the points of contact between the workpiece and the positioning member. There are three such pins, providing a three point contact, two of the pins being spaced along the longer edge of the recess 54, and the remaining pin being mounted in the shorter edge of said recess.

It is of interest to note that the radius R of the dial is oblique to both edge portions 32, 34 of the edge 20 of block 16, and also is oblique to the longitudinal center line and path of reciprocating movement of member 48, thus being oblique also to the angularly related edges of recess 54.

This arrangement is found to assure to the maximum degree precise positioning of the workpiece, no matter what angular errors may be found in the indexing, mounting, jig boring, or workpiece support block location of the dial.

It may be noted at this point that the yielding resistance provided upon the dial, to movement of workpiece W by positioning member 48, need not necessarily be through exertion of a vacuum. Instead, there may be provided yieldable abutments against which the workpiece may be pushed by the member 48.

Reciprocation of the positioning member, in the illustrated example, is effected through the provision of an air cylinder assembly generally designated 57. A connecting block 58 is fixedly secured to and projects laterally outwardly from plate 46, and secured within block 58 is the front end of a piston rod 60 projecting out of air cylinder housing 62 mounted upon bracket 64. The air cylinder is of conventional design in and of itself, and through the use of suitable circuitry or equivalent mechanism, is operated at predetermined intervals to advance and retract the positioning member.

In FIGURES 4 and 5 there is shown a modified construction, which illustrates the adaptability of the invention for incorporation in an arrangement in which the positioning member can cycle in timed relation to the printing operation, without regard to indexing of the dial. In this arrangement, thus, the dial can even move continuously, at a prescribed rate of speed, so that the precise positioning of the workpieces, and the printing of said workpieces, can be calculated to make maximum utilization of the advantages of the printing frame and work positioning assemblies. In other words, with accurate work positioning thus assured, the speed of production is calculated without being contingent in any way upon characteristics of indexing mechanisms generally associated with the dials in equipment of the type described.

Consider, thus, that in FIGURES 4 and 5 the positioning member, and in particular the extension 52a thereof, can be thin enough to completely overlie the top surface of block 16, while at the same time being below the top surface of the workpiece W. In these circumstances, positioning member 48a, when advanced, slides over the top surface of block 16, to position workpiece W. The dial can continue to rotate, and the workpiece W will be held in its position by the positioning member 48a, while the printing operation is carried out.

On completion of the printing operation, accompanied by continued rotation of the dial with positioning member 48 still in its advanced position block 16 will move out from under the workpiece, and the workpiece will drop through an opening 66 provided in the dial, into a discharge chute 68 disposed below the dial at a location at which it will register with the discharge opening 66 at the time the workpiece falls off block 16. If member 48a is mounted for reciprocating movement similarly to member 48, it can now be retracted to await the arrival of the next workpiece at the printing station. It is important to note, however, that in this form of the invention, member 48a can be mounted stationarily in its illustrated position, rather than movably. Thus, as the dial rotates, a workpiece will be brought up against member 48a, will be positioned thereby, printed or otherwise acted upon, and then caused to drop into opening 66 as the support block moves out from under the engaged workpiece upon continued movement of the dial.

The advantages of the equipment may be readily perceived and have in fact been discussed in the summary of the invention and in the description above, in large degree. It may be observed, however, in summary, that in a rotary dial operation such as here involved, wherein there is a repetitive manufacturing operation for producing a succession of like workpieces, the positioning device constituting the invention has certain particular advantages over work-orienting fixtures as now used. These are, in every instance, attached directly to the dial and are usually of the pin type, defining upstanding abutments against which the workpiece is located.

One main advantage lies in accuracy or precision in positioning the substrate relative to the printing pattern provided upon the screen of frame F. Such accuracy is maintained much closer than is true of pin type fixtures because angular error on the index mechanism of the dial has no effect on location of the part. Further, angular error in the location of the pin type fixture of the dial has no effect on location of the part. And, finally, jig bored holes in the fixture, which also contribute somewhat to position error, are no longer a factor.

The equipment also provides, in addition to greater accuracy, greater economies of operation. This is true because accuracy in dial mounting becomes much less a factor than has heretofore been the case. Jig bored holes, which are put in at substantial expense, are unnecessary, and finally, changeover for slight variations in substrate sizes is effected more quickly and cheaply.

Of an importance equal to the greater accuracy and increased economy of operation is the efficiency of the apparatus. As to efficiency, the present equipment has particular advantages in that the positioning bar may be extended to its advanced position while the dial is in the middle of its indexing cycle, so that the motion of the dial will carry the substrate up against the three points just before the end of the index cycle. This means, in turn, that the printing cycle may be initiated with the dial still in motion.

Efficiency is also produced in that the absence of pins on a work positioning fixture of the dial enables the part to be unloaded by sliding it off block 16 with the positioning member if said member is equal to the part thickness or is less than the part thickness. This is shown in FIGURES 4 and 5, and eliminates an unloading mechanism completely, it being necessary only that unloading holes such as shown at 66 be formed in the dial to register with a discharge chute.

The basic principle that has been illustrated and described herein has to do with orienting a part by causing that part to approach a fixed point or points, represented by the workpiece-engaging edge of member 48 or 48a. This principle permits a wide variety of geometric shapes so far as the workpiece and the cooperating workpiece-engaging edge of the positioning member are concerned. In the drawings, a rectangular workpiece, and a complementary edge shape on the positioning member have been illustrated by way of example. It is sufficiently obvious as not to require special illustration that the rectangular workpiece shown could be completely square. Or, the workpiece could be circular as shown at 70 in FIGURES 6–9, adapted to engage positioning member 72 having notch 74 and contact points 76.

The workpiece might alternatively (as shown in FIGURES 10–13) be circular as at 78 with a flat 80 on its circumference to allow angular orientation of the basically circular workpiece by engaging flat 82 of recess 84 of positioning member 86 having contact point 88. Or, it could be notched at some location on its circumference for the same purpose of angularly orienting a basically circular part. The circular workpiece, if provided with a flat, would be oriented by engagement of the flat against a complementary edge of the positioning member. And, if a basically circular workpiece 90 (FIGURES 14–17) be notched, the notch 92 would be engaged by a complementary projection 94 of the positioning member 96.

Or, triangular, trapezoidal, or various rhomboidal shapes can be accommodated.

It is also possible that the positioning means for the workpiece need not necessarily be upon a bar usch as shown at 48 or 48a, mounted upon the table 10. These points might be upon a plate mounted directly upon the printer or screen frame, or they might appear as small studs spot welded to the stainless steel screen mesh of the printing means. This is shown in FIGURE 18, wherein the screen frame has been designated 98, the mesh has been designated 100, and the pins have been designated 102. The work support block 104 has recesses 106, adapted to receive the pins 102, and it will be understood that the squeegee illustrated somewhat diagrammatically at 108, will deflect the screen and the pins into the plane of the workpiece 110, to assure the proper positioning of the workpiece as the dial moves and brings the workpiece into engagement with said pins, after which the printing operation is carried out with the dial either temporarily halted in its movement by indexing means, or allowed to move continuously in the manner hereinbefore discussed.

Although the hold-down means illustrated and described herein is of the vacuum type, it will be understood that other means can be employed, including yieldable abutments on the dial, or possibly a magnetic type of hold-down in instances in which the workpiece material is attractable to a magnetic element.

I claim:

1. In a repetitive manufacturing operation for producing a succession of workpieces, the combination, with means to perform a manufacturing step upon the workpieces, and with a workpiece support structure upon which the workpieces are movable in successively following order to a work station at which said means may act thereon, of apparatus for precisely positioning a workpiece at said station, comprising a workpiece positioning member mounted independently of said support structure and locatable at said station in position across the path of movement of said workpieces to engage and precisely position each workpiece reaching said station, said positioning member having a workpiece-receiving recess formed with angularly related edges whereby said recess will receive a workpiece adjacent edges of which are correspondingly angularly related, and pins mounted in and individual to the respective edges of the recess portions of the pin circumferences projecting outwardly from their associated edges to prevent contact of the workpieces by said edges with the pins and thereby constitute the pins as the sole points of contact between the positioning member and workpiece.

2. In a repetitive manufacturing operation for producing a succession of workpieces the combination, with means to perform a manufacturing step upon the workpieces, and with a workpiece support structure upon which the workpieces are movable in successively following order to a work station at which said means may act thereon, of apparatus for precisely positioning a workpiece at said station, comprising a workpiece positioning member mounted independently of said support structure and traveling in a path unaffected by said structure, from a normal retracted position into engagement with a workpiece reaching said station and thence to a final advanced position in which it shifts said workpiece to its precise position at said work station, said positioning member having a leading end provided with a workpiece-receiving recess formed with angularly related edges whereby said recess will receive a workpiece adjacent edges of which are correspondingly angularly related, said member being mounted for rectilinear movement to its advanced position along a path that is oblique to each of said angularly related edges and to the path in which the workpieces are moved upon the support structure.

3. In a repetitive manufacturing operation for producing a succession of workpieces the combination, with means to perform a manufacturing step upon the workpieces, and with a workpiece support structure upon which the workpieces are movable in successively following order to a work station at which said means may act thereon, of apparatus for precisely positioning a workpiece at said station, comprising a workpiece positioning member mounted independently of said support structure and travelling in a path unaffected by said structure, from a normal retracted position into engagement with a workpiece reaching said station and thence to a final advanced position in which it shifts said workpiece to its precise position at said work station, said positioning member having a leading end provided with a workpiece-receiving recess formed with angularly related edges whereby said recess will receive a workpiece adjacent edges of which are correspondingly angularly related, said member being mounted for rectilinear movement to its advanced position along a path oblique to each of said angularly related edges, said support structure being in the form of a rotary dial carrying the workpieces in a circular path, the radius of said dial being oblique to the path of movement of the positioning member and to the angularly related edges of the recess thereof.

4. In a repetitive manufacturing operation for producing a succession of workpieces the combination, with means to perform a manufacturing step upon the workpieces, and with a workpiece support structure upon which the workpieces are movable in successively following order to a work station at which said means may act thereon, of apparatus for precisely positioning a workpiece at said station, comprising a workpiece positioning member mounted independently of said structure and locatable at said station in position extending into the path of movement of the workpieces upon the support structure to engage each workpiece reaching said station, said member having a workpiece receiving recess formed with angularly related edges whereby said recess will receive a workpiece adjacent edges of which are correspondingly angularly related and will precisely position the workpiece at the work station, said support structure being in the form of a rotary dial carrying the workpieces in a circular path, the radius of said dial being oblique to the angularly related edges of said recess of the positioning member.

5. In a repetitive manufacturing operation for producing a succession of workpieces the combination, with means to perform a manufacturing step upon the workpieces, and with a workpiece support structure upon which the workpieces are movable in successively following order to a work station at which said means may act thereon, of apparatus for precisely positioning a workpiece at said station, comprising a workpiece positioning member mounted independently of said support structure and travelling in a path unaffected by said structure, from a normal retracted position into engagement with a workpiece reaching said station and thence to a final advanced position in which it shifts said workpiece to its precise position at said work station, said support structure including means acting upon the workpiece to cause it to yieldably oppose the movement thereof to its precise position, said positioning member being in the form of a bar having a leading end formed with a workpiece-receiving recess provided with angularly related edges each of which has at least one projection for contacting the workpiece, said structure including individual support blocks for the respective workpieces having angularly related, ledge-like edges closely spaced from and generally parallel to the corresponding edges of said recess in the final position of said member.

References Cited

UNITED STATES PATENTS

| | | | |
|---|---|---|---|
| 2,059,177 | 10/1936 | Ohrn | 198—29 |
| 2,723,743 | 11/1955 | Carter | 198—33.2 |

RICHARD E. AEGERTER, *Primary Examiner.*

U.S. Cl. X.R.

198—19